(12) United States Patent
Nagata

(10) Patent No.: US 10,812,666 B2
(45) Date of Patent: *Oct. 20, 2020

(54) IMAGE PROCESSING SYSTEM

(71) Applicant: Sharp Kabushiki Kaisha, Sakai, Osaka (JP)

(72) Inventor: Yoshinori Nagata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,200

(22) Filed: Sep. 5, 2019

(65) Prior Publication Data
US 2019/0394344 A1 Dec. 26, 2019

Related U.S. Application Data

(63) Continuation of application No. 16/163,710, filed on Oct. 18, 2018, now Pat. No. 10,455,098, which is a (Continued)

(30) Foreign Application Priority Data

Oct. 20, 2010 (JP) ................................. 2010-235838

(51) Int. Cl.
*G06F 3/12* (2006.01)
*H04N 1/00* (2006.01)

(52) U.S. Cl.
CPC ....... *H04N 1/00222* (2013.01); *G06F 3/1204* (2013.01); *G06F 3/1257* (2013.01); *G06F 3/1258* (2013.01); *G06F 3/1288* (2013.01); *H04N 1/0044* (2013.01); *H04N 1/00204* (2013.01); *H04N 1/00501* (2013.01); *H04N 1/00795* (2013.01); *H04N 2201/0039* (2013.01); *H04N 2201/0094* (2013.01); *H04N 2201/3204* (2013.01)

(58) Field of Classification Search
CPC .... G06F 3/1204; G06F 3/1257; G06F 3/1258; G06F 3/1288; H04N 1/00204; H04N 1/00222; H04N 1/0044; H04N 1/00501; H04N 1/00795; H04N 2201/0039; H04N 2201/0094; H04N 2201/3204

See application file for complete search history.

(56) References Cited

U.S. PATENT DOCUMENTS

| 2010/0171982 A1* | 7/2010 | Sato | G06F 3/1203 358/1.15 |
| 2011/0075198 A1* | 3/2011 | Agehama | G06F 3/1203 358/1.15 |
| 2011/0273738 A1* | 11/2011 | Tanaka | H04N 1/0097 358/1.14 |

OTHER PUBLICATIONS

Nagata, "Image Processing System", U.S. Appl. No. 16/163,710, filed Oct. 18, 2018.

\* cited by examiner

*Primary Examiner* — Helen Zong
(74) *Attorney, Agent, or Firm* — Keating & Bennett, LLP

(57) ABSTRACT

In an image processing system, a multifunction printer carries out image reading or printing in accordance with processing execution condition information stored in a storage apparatus of a host PC. A storage apparatus of a client PC stores processing execution condition information. In a case where the client PC is connected to the host PC via the network, a control apparatus transmits the processing execution condition information stored in the storage apparatus to the host PC. The host PC stores the received processing execution condition information in the storage apparatus.

5 Claims, 14 Drawing Sheets

Related U.S. Application Data continuation of application No. 15/350,288, filed on Nov. 14, 2016, now Pat. No. 10,182,164, which is a continuation of application No. 13/273,326, filed on Oct. 14, 2011, now abandoned.

FIG. 7

```
PLEASE SPECIFY SCANNING CONDITION

SCAN TARGET  | SCANNING CONDITION | PC PROCESSING

COLOR MODE      FULL COLOR
PAPER SIZE      A4
RESOLUTION      300DPI
BOTH SIDE       YES
DENSITY         STANDARD

EXECUTE — 209
```
↑↓ — 204

FIG. 8

```
PLEASE SPECIFY SCANNING CONDITION

PROFILE HAS BEEN CHANGED

SAVE CHANGED PROFILE?

210         211            212
    NO     OVERWRITE SAVE   SAVE AS NEW
                              PROFILE

EXECUTE — 209
```
↑↓ — 204

F I G. 1 6

(PC PROCESSING CONDITON)

| SKEW CORRECTION ON/OFF |
| --- |
| SKEW CORRECTION PARAMETER |
| CHARACTER RECOGNITION ON/OFF |
| CHARACTER RECOGNITION PARAMETER |
| HIGH IMAGE COMPRESSION ON/OFF |
| HIGH IMAGE COMPRESSION PARAMETER |
| . . . |
| APPLICATION LAUNCH ON/OFF |
| APPLICATION LAUNCH PARAMETER |

IMAGE PROCESSING SYSTEM

This Nonprovisional application claims priority under 35 U.S.C. § 119(a) on Patent Application No. 2010-235838 filed in Japan on Oct. 20, 2010, the entire contents of which are hereby incorporated by reference.

TECHNICAL FIELD

The present invention relates to an image processing system which carries out scanning or printing in accordance with a predetermined scanning condition or predetermined printing condition, and to a storage medium.

BACKGROUND ART

There has been known an image processing system having an image forming apparatus and a host computer (hereinafter, referred to as host PC) which are connected via a network. As an arrangement for the image processing system, there has been such a conventional arrangement that the host PC stores a plurality of document reading conditions for the image forming apparatus in advance, and the image forming apparatus carries out document reading (scanning) in accordance with a document reading condition(s) selected by a user.

Patent Literature 1 discloses the following arrangement. That is, an image reading system has a scanner and a scan server which are connected via a network. The scan server stores reading information such as document reading conditions for the scanner. In response to input of a user ID into the scanner, the scan server transmits, to the scanner, reading information corresponding to the user ID. The scanner displays, on its operation/display section, the reading information received from the scan server. A setting(s) indicated in reading information displayed on the operation/display section can be changed by a user. In a case where a user changes a setting(s) indicated by the reading information, the scanner carries out document reading in accordance with a new setting(s). The reading information changed by the user is stored in the scan server.

CITATION LIST

Patent Literature 1
Japanese Patent Application Publication, Tokukai, No. 2003-87479 A (Publication Date: Mar. 20, 2003)

SUMMARY OF INVENTION

Technical Problem

According to the conventional arrangement, all the document reading conditions are stored in the host PC and the scan server. A portable client computer (hereinafter, referred to as a client PC) such as a notebook personal computer (hereinafter, referred to as a note PC) or the like may be connected to the network as well.

Such a note PC, i.e., the client PC is brought out from a system (network environment) to which the client PC is usually connected, in order to be connected to another system (network environment) in a destination of a user. In this case, it is impossible to swiftly start document reading under desired document reading conditions by using, e.g., a scanner of a multifunction printer in the another system after connecting the client PC to a host PC in the another system.

Further, the conventional system is specialized in document reading by a scanner for which document reading predetermined document reading conditions are selected. Thus, no consideration is given to printing by a printing apparatus for which printing predetermined printing conditions are selected In view of this, an object of the present invention is to provide an image processing system and a storage medium each of which makes it possible to swiftly carry out reading by the image reading apparatus or printing by the printing apparatus even if the client apparatus is brought out from a first image processing system so as to be connected with a host apparatus in a second image processing system.

Solution to Problem

An image processing system of the present invention includes: an image forming apparatus; a client apparatus; and a host apparatus, each of said image forming apparatus and said client apparatus being connected with said host apparatus via a network, said image forming apparatus including at least one of an image reading apparatus which carries out image reading and a printing apparatus which carries out printing, said host apparatus including a host-side storage apparatus and a host-side control section, said at least one of the image reading and the printing being carried out in accordance with processing execution condition information stored in the host-side storage apparatus, said client apparatus including a client-side storage apparatus and a client-side control section, the client-side storage apparatus storing the processing execution condition information for said at least one of the image reading and the printing, the client-side control section being configured such that, when said client apparatus is connected with said host apparatus via the network, the client-side control section transmits the processing execution condition information to said host apparatus, and the host-side control section being configured such that, in a case where the host-side control section receives the processing execution condition information from said client apparatus, the host-side control section causes the host-side storage apparatus to store the processing execution condition information.

According to the arrangement, the client apparatus may be brought out from a first image processing system so as to be connected, via a network, with a host apparatus in a second image processing system which is different from the first image processing system.

In this case, the client-side control section of the client apparatus transmits, to the host apparatus, the processing execution condition information stored in the client-side storage apparatus, i.e., the processing execution condition information for at least one of the image reading by the image forming apparatus and the printing by the printing apparatus.

In a case where the host-side control section of the host apparatus in the second image processing system receives the processing execution condition information from the client apparatus, the host-side control section stores the processing execution condition information in the host-side storage apparatus. Then, in accordance with the processing execution condition information stored in the host-side storage apparatus of the host apparatus, the image forming apparatus in the second image processing system carries out at least one of the image reading by the image reading apparatus and the printing by the printing apparatus.

This makes it possible to use, also in the second image processing system, the existing processing execution condition information retained by the client apparatus in the first image processing system even if the client apparatus is brought out from the first image processing system so as to be connected with the host apparatus in the second image processing system. This makes it possible to swiftly carry out the image reading by the image reading apparatus or the printing by the printing apparatus in the second image processing system, in accordance with the existing processing execution condition information retained by the client apparatus.

Advantageous Effects of Invention

As described above, the arrangement of the present invention makes it possible to use, also in the second image processing system, the existing processing execution condition information retained by the client apparatus in the first image processing system even if the client apparatus is brought out from the first image processing system so as to be connected with the host apparatus in the second image processing system. This makes it possible to swiftly carry out the image reading by the image reading apparatus or the printing by the printing apparatus in the second image processing system, in accordance with the existing processing execution condition information retained by the client apparatus.

BRIEF DESCRIPTION OF DRAWINGS

FIG. 7 is an explanatory view illustrating a user interface (profile content display screen) for setting scanning/printing conditions and PC processing conditions which user interface is displayed by the display apparatus of the multifunction printer in FIG. 1.

FIG. 8 is an explanatory view illustrating a user interface (profile saving option selection screen) for selecting how to save a profile which user interface is displayed by the display apparatus of the multifunction printer in FIG. 1.

FIG. 16 is an explanatory view showing an overview of a data structure of PC processing conditions contained in profile information illustrated in FIG. 2.

DESCRIPTION OF EMBODIMENTS

Figure 1:
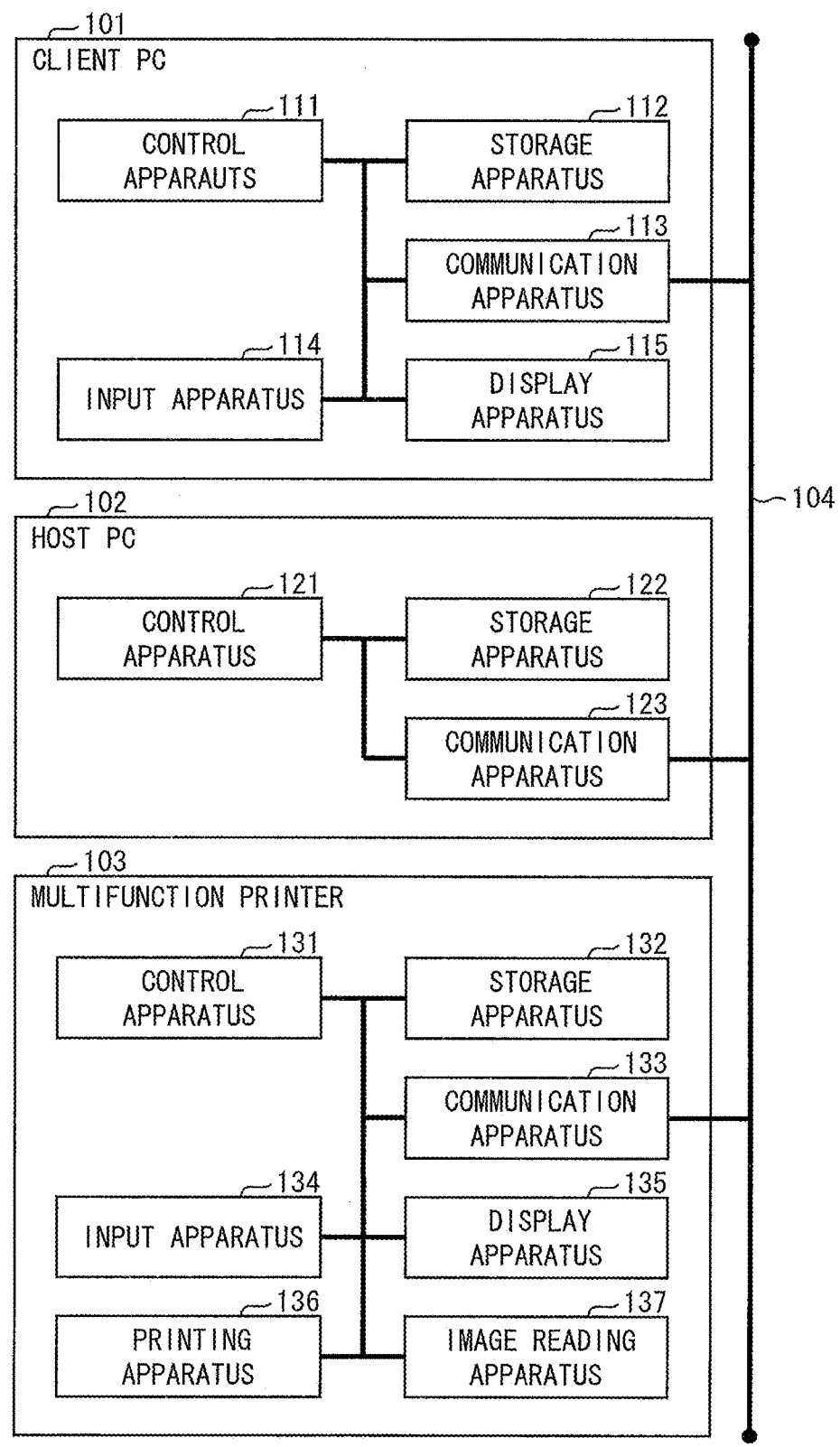
FIG. 1 is a block diagram illustrating an arrangement of an image processing system of an embodiment of the present invention.

FIG. 1 is a block diagram illustrating an arrangement of an image processing system of an embodiment of the present invention. As illustrated in FIG. 1, the image processing system includes a client PC 101, a host PC 102, and a multifunction printer (image forming apparatus) 103 which are connected via a network 4. The client PC 101 is, e.g., a portable personal computer.

The client PC (client apparatus) 101 includes a control apparatus (client-side control apparatus) 111, a storage apparatus (client-side storage apparatus) 112, a communication apparatus 113, an input apparatus (client-side input apparatus) 114, and a display apparatus (client-side display apparatus) 115. The communication apparatus 113 is connected with a network 104. The control apparatus 111 is a CPU or the like. The storage apparatus 112 is a hard disk drive, a RAM, or the like. The communication apparatus 113 is a LAN card or the like. The input apparatus 114 is a keyboard, a mouse, or the like. The display apparatus 115 is a liquid crystal display apparatus or the like.

The host PC (host apparatus) 102 includes a control apparatus (host-side control apparatus) 121, a storage apparatus (host-side storage apparatus) 122, and a communication apparatus 123. The communication apparatus 123 is connected with the network 104. The control apparatus 121 is a CPU or the like. The storage apparatus 122 is a hard disk drive, a RAM, or the like. The communication apparatus 123 is a LAN card or the like.

The host PC 102 provides various user interfaces to the display apparatuses 115 and 135 in accordance with a request from the client PC 101 and a request from the multifunction printer 103 so that the display apparatuses 115 and 135 displays the various user interfaces. For this purpose, the host PC 102 stores or generates display data of the various user interfaces.

The multifunction printer 103 includes a control apparatus (image forming apparatus-side control apparatus) 131, a storage apparatus (image forming apparatus-side storage apparatus) 132, a communication apparatus 133, an input apparatus (image forming apparatus-side input apparatus) 134, a display apparatus (image forming apparatus-side display apparatus) 135, a printing apparatus 136, and an image reading apparatus 137. The communication apparatus 133 is connected with the network 104. The control apparatus 131 is a CPU or the like. The storage apparatus 132 is a hard disk drive, a RAM, or the like. The communication apparatus 133 is a LAN card or the like. The input apparatus 134 is a numeric keypad, a touch panel, or the like. The display apparatus 135 is a liquid crystal display apparatus or the like. The printing apparatus 136 carries out printing on a sheet of paper. The image reading apparatus 137 reads information printed on a sheet of paper so as to generate image data.

Figure 2:
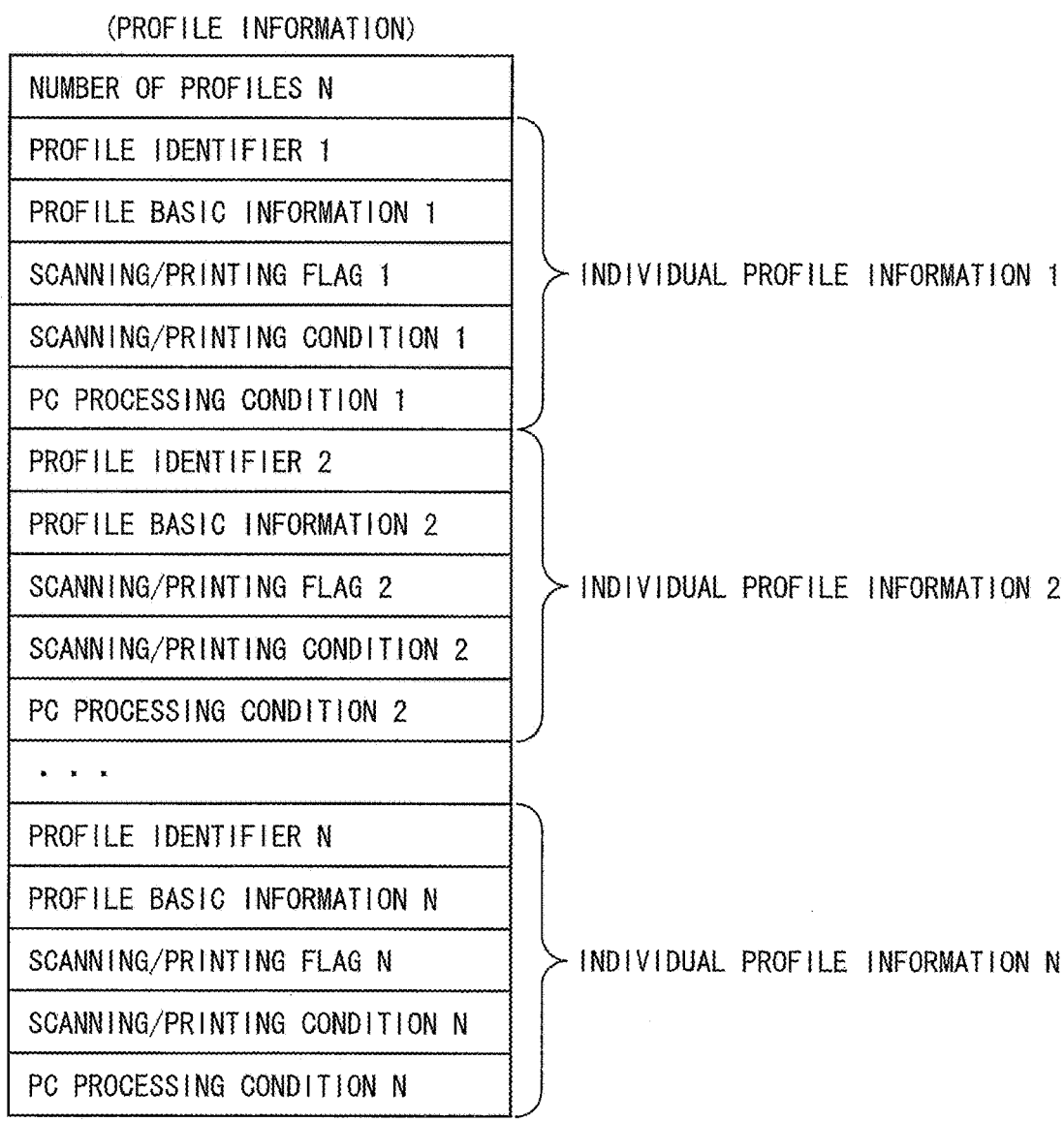
FIG. 2 is an explanatory view illustrating an overview of a data structure of profile information which is stored in a storage apparatus of a host PC in FIG. 1 and in a storage apparatus of a client PC in FIG. 1.
Figure 3:
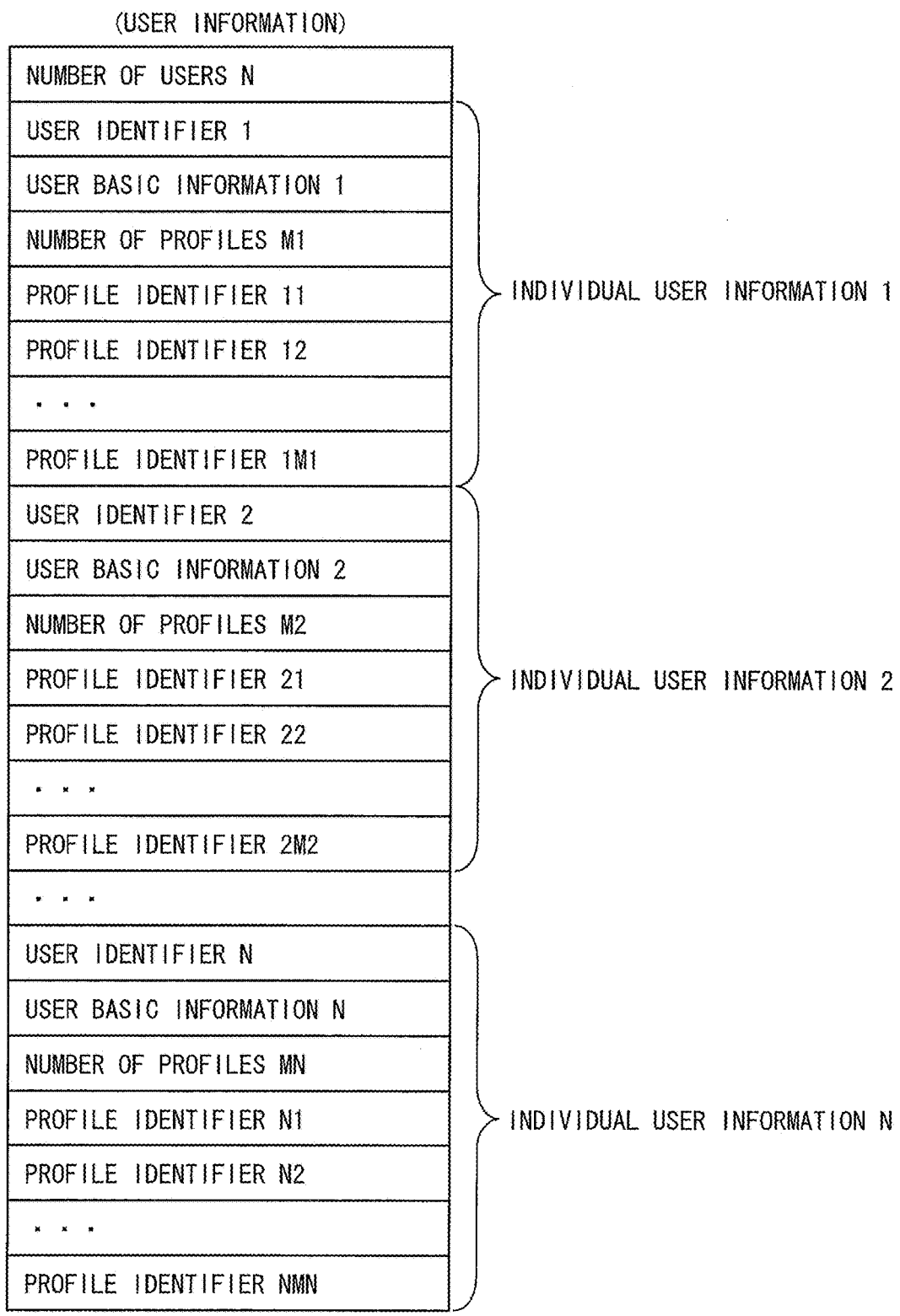
FIG. 3 is an explanatory view illustrating an overview of a data structure of user information which is stored in a storage apparatus of a host PC in FIG. 1 and in a storage apparatus of the client PC in FIG. 1.

FIG. 2 is an explanatory view illustrating an overview of a data structure of profile information which is stored in the storage apparatus 112 of the client PC 101 of FIG. 1 and in the storage apparatus 122 of the host PC 102 of FIG. 1. FIG. 3 is an explanatory view illustrating an overview of a data structure of user information which is stored in the storage apparatus 112 of the client PC 101 of FIG. 1 and in the storage apparatus 122 of the host PC 102 of FIG. 1. The profile information and the user information are generated on the client PC 101 or on the host PC 102.

In the image processing system of the present embodiment, the profiles are created individually for users and each of the profiles is made up of a scanning profile that the image reading apparatus 137 uses when carrying out scanning and a printing profile that the printing apparatus 136 uses when carrying out printing. The scanning profile and the printing profile are stored in the storage apparatus 112 of the client PC 101 and in the storage apparatus 122 of the host PC 102.

The profile information shown in FIG. 2 and the user information shown in FIG. 3 are related with each other in such a way that the profile information (see FIG. 2) is generated individually for each of individual user information 1 through N in the user information (see FIG. 3). The pieces of individual user information are pieces of user information which are generated individually for users. Accordingly, a profile identifier 11 in the individual user information 1 (see FIG. 3) corresponds to a profile identifier 1 in a individual profile information 1 (see FIG. 2), a profile identifier 12 in the individual user information 1 (see FIG. 3) corresponds to a profile identifier 2 in a individual profile information 2 (see FIG. 2), . . . and a profile identifier 1M1 in the individual user information N (see FIG. 3) corresponds to a profile identifier N in a individual profile information N (see FIG. 2).

As shown in FIG. 2, the profile information is made up of (i) information indicative of the number N of the profiles (the number of pieces of the individual profile information) contained in the profile information, and (ii) the individual profile information 1 through N in the number of N equally to the number of the profiles.

Each piece of the individual profile information 1 through N contains a profile identifier, a profile name, profile basic information, a scanning/printing flag, a scanning/printing condition, and a PC processing condition.

The profile identifier is for identifying one individual profile information containing the profile identifier by distinguishing the one individual profile information from other individual profile information. The profile basic information is information such as profile icon information which information is set individually for each profile (for each piece of the individual profile information). The scanning/printing flag is a flag which is used for determining whether a profile indicated by a individual profile information is a scanning profile or a printing profile. The scanning/printing condition indicates (i) a condition under which the image reading apparatus 137 carries out scanning (scanning condition) or (ii) a condition under which the printing apparatus 136 carries out printing (printing condition), in accordance with whether a individual profile information containing the scanning/printing condition indicates a scanning profile or a printing profile. The PC processing conditions indicate conditions under which the client PC 101 or the host PC 102 carries out a PC process.

As shown in FIG. 3, the user information is made up of (i) information indicative of the number N of users (the number of individual user information) contained in the user information, and (ii) the individual user information 1 through N in the number of N equally to the number of the users. Each of the individual user information contains a user identifier, a user name, user basic information, the number M1 through MN of profiles contained in the individual user information (the number of profiles that a user indicated by the user identifier has), and a profile identifier.

The user identifier is for identifying individual user information containing the user identifier by distinguishing the individual user information from other individual user information. The user basic information is information such as user icon information which information is set individually for users (for each of the individual user information). Each of the individual user information contains profile identifiers which are equal in number to the number M1 through MN of profiles contained in the individual user information.

Figure 4:
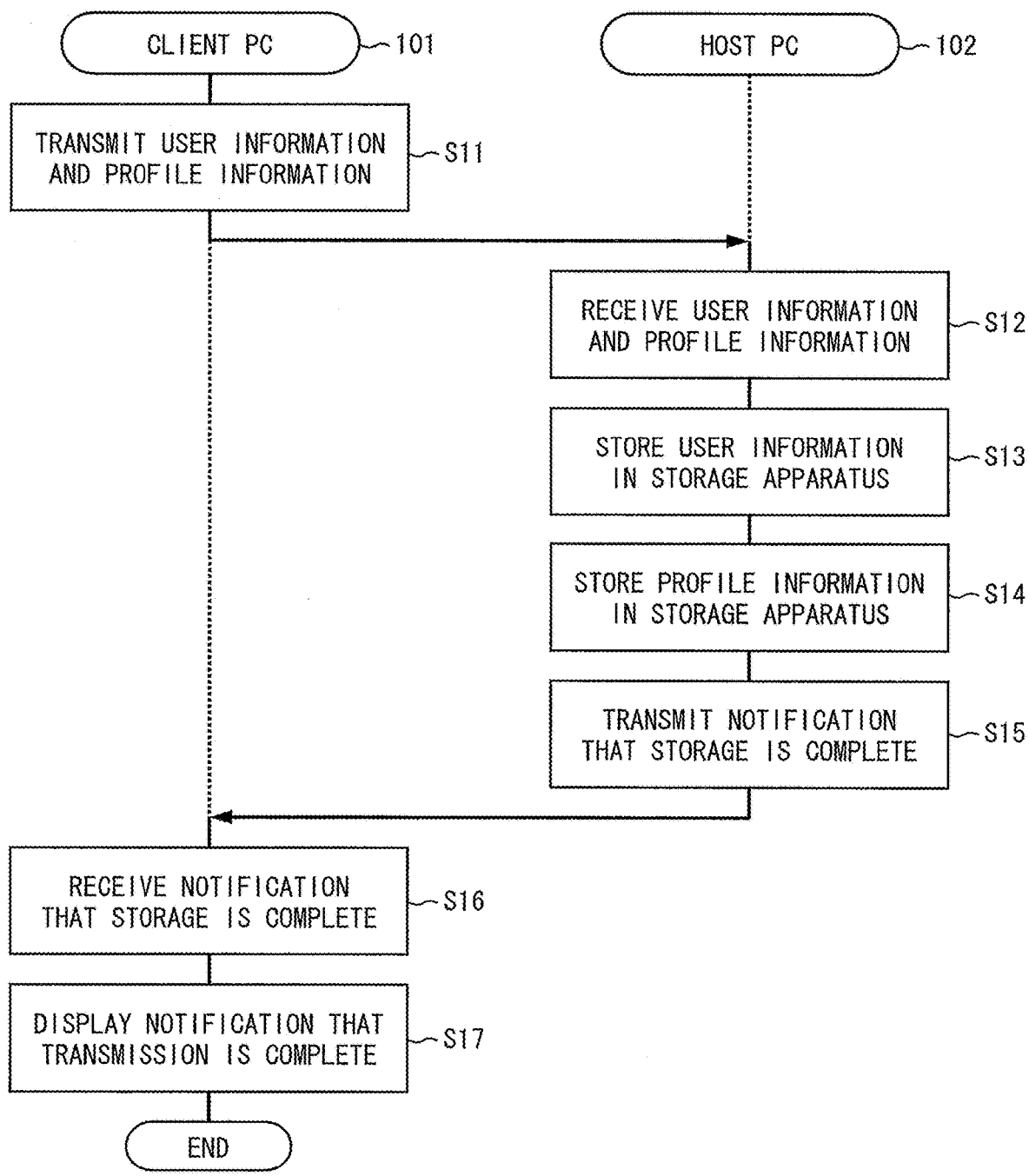
FIG. 4 is a flowchart showing how the image processing host PC in FIG. 1. Specifically, the flowchart shows how the user information and the profile information which are stored in the client PC are stored in the host PC.

The following describes how the image processing system of the present embodiment operates. FIG. 4 is a flowchart showing how the image processing system operates after the client PC 101 is connected to the host PC 102. Specifically, the flowchart shows how the user information and the profile information which are stored in the client PC 101 are stored in the host PC 102.

According to FIG. 4, in a case where the client PC 101 is connected to the host PC 102 via the network 104, the control apparatus 111 of the client PC 101 transmits the user information and the profile information stored in the storage apparatus 112 to the host PC 102 via the communication apparatus 113 and the network 104 (S11).

The control apparatus 121 of the host PC 102 receives, via the network 104 and the communication apparatus 123, the user information and the profile information transmitted from the client PC 101 (S12).

The control apparatus 121 of the host PC 102 causes the storage apparatus 122 to store the user information thus received (S13). In this case, the control apparatus 121 determines whether or not a user identifier of each of the individual user information contained in the user information thus received matches any one of user identifiers of individual user information which have been previously stored in the storage apparatus 122. In a case where the control apparatus 121 determines that a user identifier of a individual user information transmitted from the client PC 101 matches a user identifier of one of individual user information which is stored in the storage apparatus 122, the one of the individual user information stored in the storage apparatus 122 is overwritten with the individual user information transmitted from the client PC 101. In contrast, in a case where the control apparatus 121 determines that a user identifier of a individual user information transmitted from the client PC 101 does not match any one of user identifiers of the individual user information stored in the storage apparatus 122, the individual user information transmitted from the client PC 101 is newly stored in the storage apparatus 122. Thus, the number of users in the user information is increased by the number of individual user information thus newly stored in the storage apparatus 122.

Then, the control apparatus 121 of the host PC 102 causes the storage apparatus 122 to store the profile information received from the client PC 101 (S14). In this case, the control apparatus 121 determines whether or not a profile identifier of each of the individual profile information contained in the profile information thus received matches any one of profile identifiers of individual profile information which is stored in the storage apparatus 122. In a case where the control apparatus 121 determines that a profile identifier of a individual profile information transmitted from the client PC 101 matches a profile identifier of one of individual profile information which have been previously stored in the storage apparatus 122, the one of the individual profile information stored in the storage apparatus 122 is overwritten with the individual profile information transmitted from the client PC 101. In contrast, in a case where the control apparatus 121 determines that a profile identifier of a individual profile information transmitted from the client PC 101 does not match any one of profile identifiers of the individual profile information stored in the storage apparatus 122, the individual profile information transmitted from the client PC 101 is newly stored in the storage apparatus 122. Thus, the number of profiles in the profile information is increased by the number of individual profile information thus newly stored in the storage apparatus 122.

Then, the control apparatus 121 of the host PC 102 transmits, to the client PC 101 via the communication apparatus 123 and the network 104, a notification that the storing of the user information and the profile information in the storage apparatus 122 is completed (S15).

The control apparatus 111 of client PC 101 receives the notification from the host PC 102 via the network 104 and the communication apparatus 113 (S16). Then, the control apparatus 111 causes the display apparatus 115 of the client PC 101 to display to inform that the user information and the profile information have been notified to the host PC 102 (S12).

Figure 5:
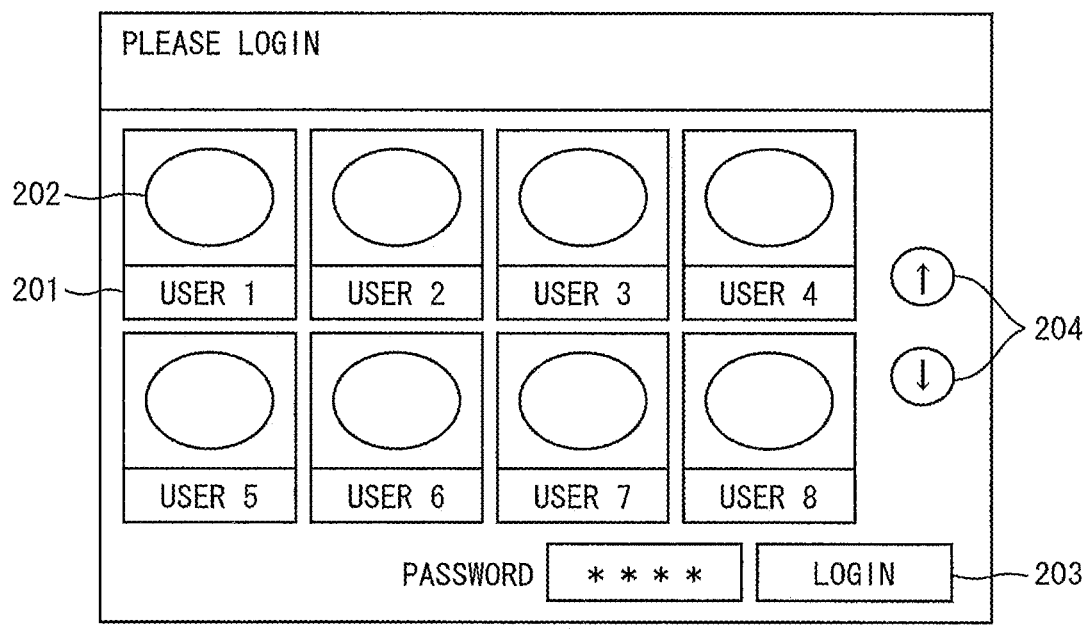
FIG. 5 is an explanatory view illustrating a user interface (login screen) for logging in to the image processing system which user interface is displayed by the display apparatus of the multifunction printer in FIG. 1.
Figure 6:
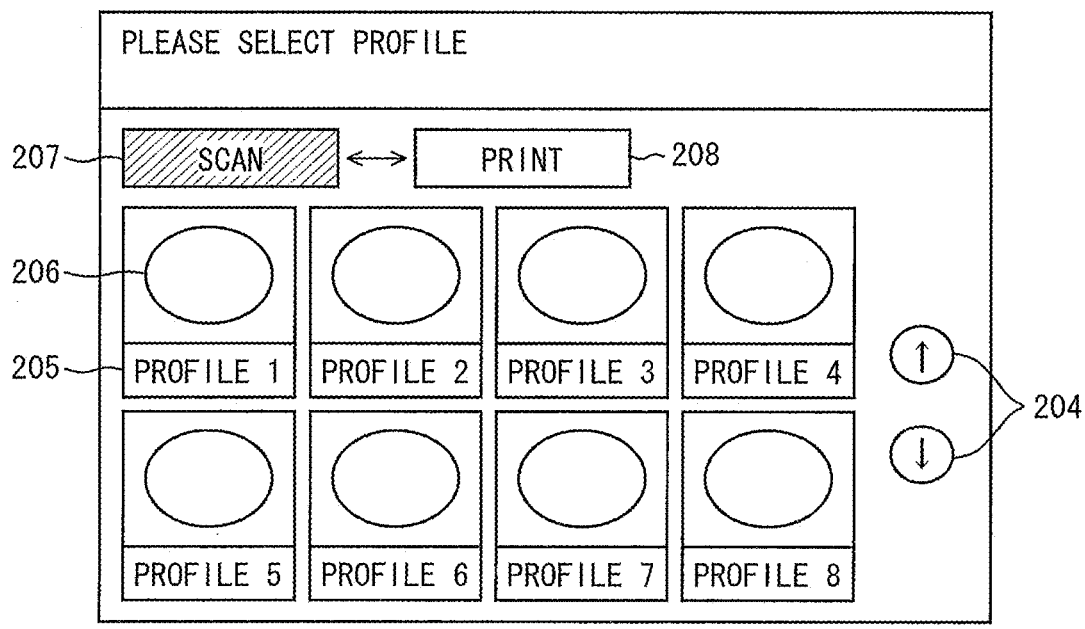
FIG. 6 is an explanatory view illustrating a user interface (profile list screen) for selecting a profile which user interface is displayed by the display apparatus of the multifunction printer in FIG. 1.

FIGS. 5 through 8 are explanatory views illustrating user interfaces which are displayed on the display apparatus 135 of the multifunction printer 103. Specifically, FIG. 5 is an explanatory view illustrating a user interface for logging in to the image processing system (login screen for image processing system). FIG. 6 is an explanatory view illustrating a user interface for selecting a profile (profile list screen, processing execution condition information list screen). FIG. 7 is an explanatory view illustrating a user interface for setting scanning/printing conditions and PC processing conditions (profile content display screen). FIG. 8 is an explanatory view illustrating a user interface for selecting how to save a profile (profile saving option selection screen).

The display apparatus 135 of the multifunction printer 103 displays an initial screen after power of the multifunction printer 103 is turned on. Then, in a case where a predetermined button for logging in to the image processing system is pushed, the display apparatus 135 displays the login screen illustrated in FIG. 5. The predetermined button is a button which has been assigned to the image processing system by, e.g., pre-registration with the button. The login screen shows (i) user names 201 of users registered with the host PC 102 and (ii) user icons 202 indicative of the users. In a case where there are undisplayed user names 201 and corresponding user icons 202 within the login screen, pushing of an UpArrow scroll button 204 or a DownArrow scroll button 204 makes it possible to display the undisplayed user names 201 and the corresponding user icons 202.

In a case where a user of the multifunction printer 103 correctly enters his user name and password on the login screen and then pushes a login button 203, a profile list screen corresponding to the user name is displayed as illustrated in FIG. 6. On the profile list screen illustrated in FIG. 6, a scanning selection button 207 is highlighted because the scanning selection button 207 has been pushed. In other words, scanning profiles each of which indicates scanning conditions for the image reading apparatus 137 of the multifunction printer 103 are selected on the profile list screen illustrated in FIG. 6.

In the present embodiment, a user of the multifunction printer 103 is basically a user of the client PC 101. A user of the multifunction printer 103 can be identified as a user of the client PC 101 by successfully logging in the image processing system on the login screen of FIG. 5.

The profile list screen illustrated in FIG. 6 shows (i) profile names 205 of profiles correlated with the user name specified on the login screen illustrated in FIG. 5, and (ii) profile icons 206 indicative of the profiles. In addition, the profile list screen shows the scanning selection button 207 for selecting scanning and a printing selection button 208 for selecting printing. That is, on the profile list screen, a user can choose whether to perform profile selection for a scanning profile or a printing profile, and then perform the profile selection to choose any of a plurality of pre-registered profiles (e.g., profiles 1 through 8) for the scanning profile or the printing profile thus selected.

When a profile to use is selected on the profile list screen by the user, a profile content display screen (processing execution condition information content screen) for the profile is displayed. FIG. 7 illustrates such a profile content display screen. The profile content display screen shows (i) scanning/printing conditions of a profile specified on the profile list screen and (ii) PC processing conditions (additional processing execution condition information) of the profile. FIG. 7 illustrates an example of the profile content display screen which is displayed in a case where, on the profile list screen illustrated in FIG. 6, it has been chosen to perform the profile section for a scanning profile and, e.g., any one of the profiles 1 through 8 has been chosen. A user of the multifunction printer 103 can carry out operations on the profile content display screen so as to view and/or change the scanning/printing conditions for the multifunction printer 103 and the PC processing conditions (e.g., processing conditions for the client PC 101).

In a case where the user does not change any of the scanning/printing conditions nor any of the PC processing conditions on the profile content display screen, scanning or printing is carried out in response to user's pushing an execution button 209 on the profile content display screen. In a case where any of the scanning/printing conditions and the PC processing conditions has been changed on the profile content display screen, the profile saving option selection screen illustrated in FIG. 8 is displayed.

In a case where the user pushes a No button 210 on the profile saving option selection screen, scanning or printing is carried out. In a case where the user pushes an Overwrite Save button 211, a change(s) to a scanning/printing condition(s) and/or a PC processing condition(s) is saved in a corresponding profile stored in each of the storage apparatus 112 of the client PC 101 and the storage apparatus 122 of the host PC 102. In a case where the user pushes a Save As New Profile button 212, the change(s) is saved in each of the storage apparatuses 112 and 122 as a new profile.

Figure 9:
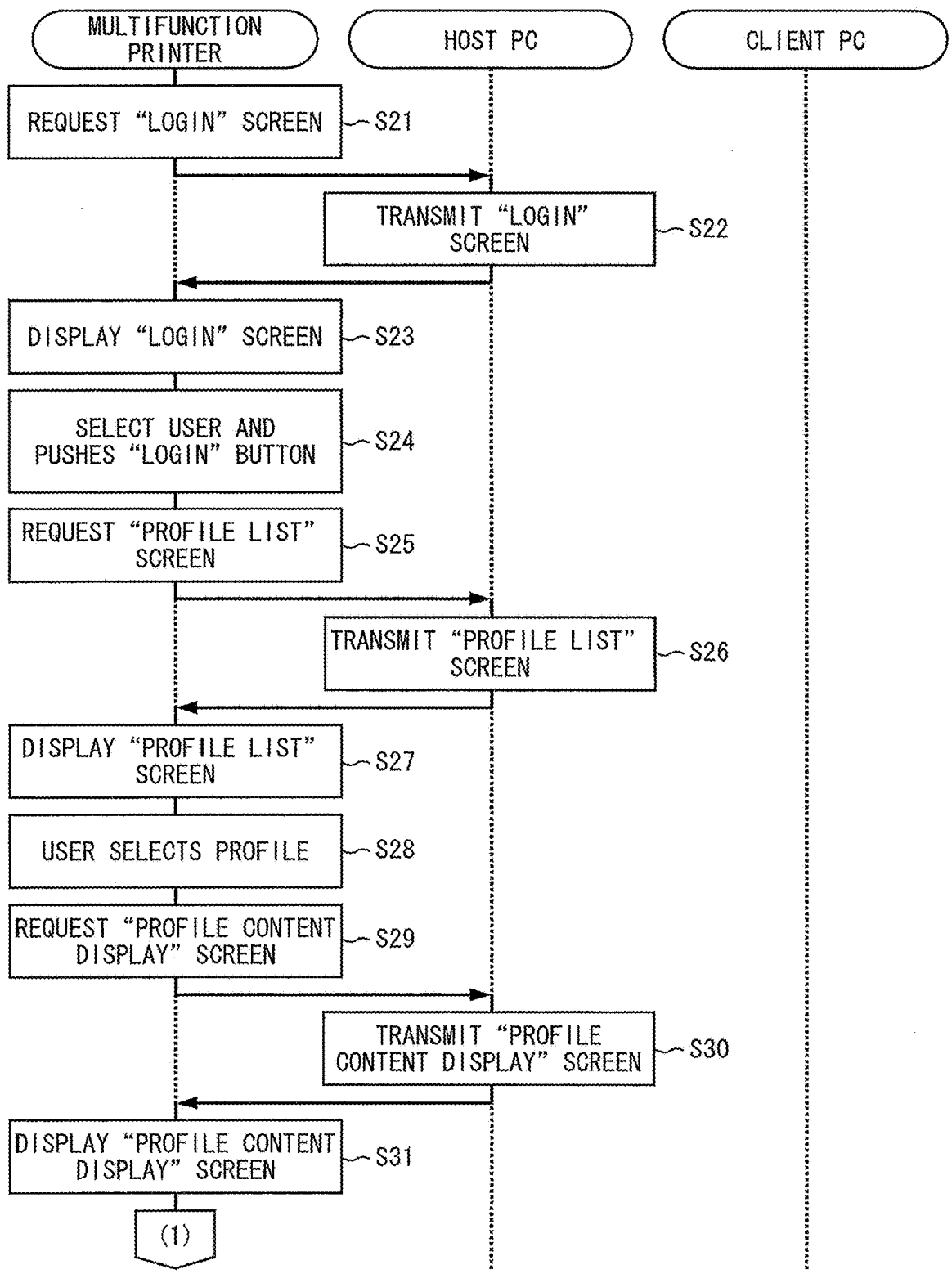
FIG. 9 is a flowchart showing how the image processing system in FIG. 1 operates in a first part of the period from login to the image processing system to completion of scanning.
Figure 10:
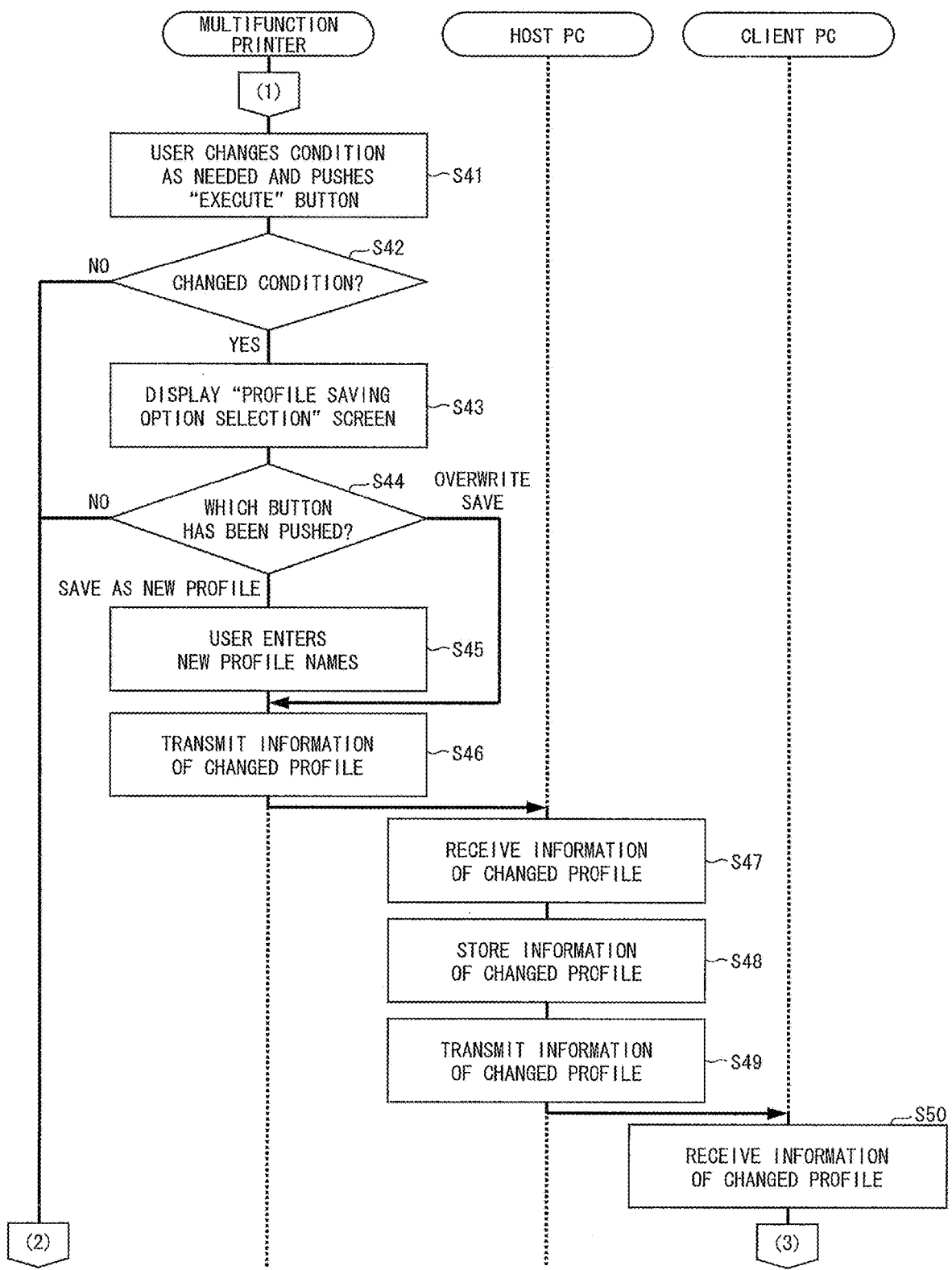
FIG. 10 is a flowchart showing how the image processing system in FIG. 1 operates in a middle part which follows the first part illustrated in FIG. 9.
Figure 11:
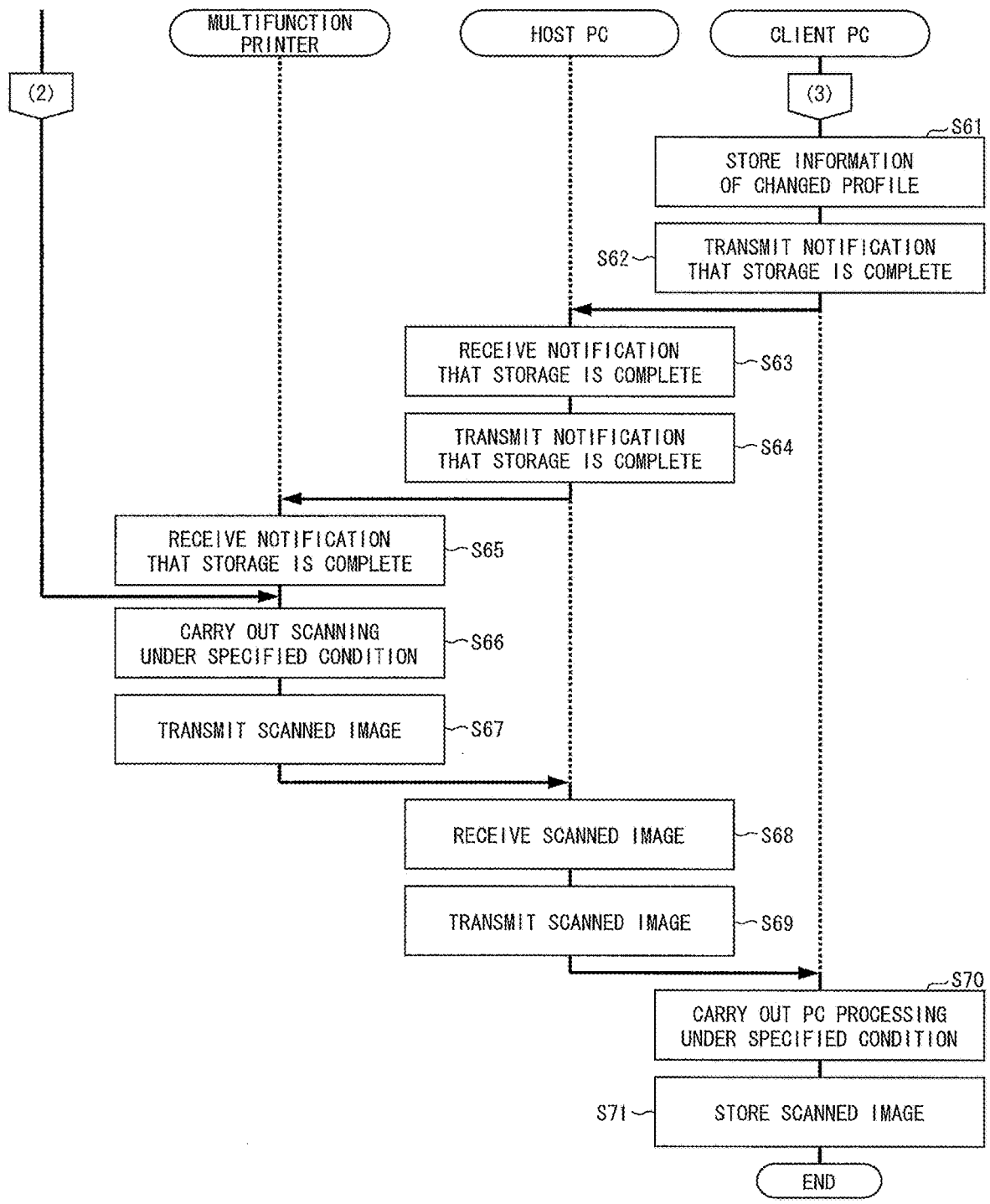
FIG. 11 is a flowchart showing how the image processing system in FIG. 1 operates in a last part which follows the middle part illustrated in FIG. 10.

With reference to FIGS. 9 through 11, the following describes how the image processing system operates during a period from the login to the image processing system to completion of scanning. FIG. 9 is a flowchart showing how the image processing system of the present embodiment operates in a first part of the period from the login to the image processing system to the completion of scanning. FIG. 10 is a flowchart showing how the image processing system operates in a middle part which follows the first part. FIG. 11 is a flowchart showing how the image processing system operates in a last part which follows the middle part.

In a case where a user pushes the predetermined button for logging in to the image processing system while the initial screen is displayed on the display apparatus 135, the multifunction printer 103 causes the display apparatus 135 to display the login screen illustrated in FIG. 5.

In this case, pushing of the predetermined button causes the control apparatus 131 of the multifunction printer 103 to transmit, to the host PC 102 via the communication apparatus 133 and the network 104, a request that the host PC 102 transmits display data indicative of the login screen to the control apparatus 131 (S21).

The control apparatus 121 of the host PC 102 receives the request via the network 104 and the communication apparatus 123 and transmits the display data to the multifunction printer 103 via the communication apparatus 123 and the network 104 in response to the request (S22). The control apparatus 131 of the multifunction printer 103 receives the display data from the host PC 102 via the network 104 and the communication apparatus 133 so as to display the login screen illustrated in FIG. 5 (S23).

Then, a user operates the input apparatus 134 so as to specify the user and enter password and then push the login button 203 on the login screen displayed on the display apparatus 135 (S24). Accordingly, the control apparatus 131 of the multifunction printer 103 transmits, to the host PC 102 via the communication apparatus 133 and the network 104, a request that the host PC 102 transmits display data indicative of the profile list screen to the control apparatus 131 (S25).

The control apparatus 121 of the host PC 102 receives the request via the network 104 and the communication apparatus 123 and transmits, to the multifunction printer 103 via the communication apparatus 123 and the network 104 in response to the request, the display data indicative of the profile list screen containing a list of profiles corresponding to a user identifier of the user name entered on the login screen (S26).

The control apparatus 131 of the multifunction printer 103 receives the display data via the network 104 and the communication apparatus 133 so as to display, on the display apparatus 135, the profile list screen illustrated in FIG. 6 (S27).

Then, a user operates the input apparatus 134 so as to select any one of the profiles on the profile list screen displayed on the display apparatus 135 (S28). Accordingly, the control apparatus 131 of the multifunction printer 103 transmits, to the host PC 102 via the communication apparatus 133 and the network 104, a request that the host PC 102 transmits display data indicative of the profile content display screen to the control apparatus 131 (S29).

The control apparatus 121 of the host PC 102 receives the request via the network 104 and the communication apparatus 123 and transmits, to the multifunction printer 103 via the communication apparatus 123 and the network 104 in response to the request, the display data indicative of the profile content display screen containing profile information corresponding to a profile identifier of the profile selected by the user (S30).

The control apparatus 131 of the multifunction printer 103 has received the display data via the network 104 and the communication apparatus 133, then causes the display apparatus 135 to display the profile content display screen illustrated in FIG. 7 (S31).

Then, according to need, the user operates the input apparatus 134 so as to change a scanning condition(s) or a printing condition(s), and push the execution button 209 on the profile content display screen displayed on the display apparatus 135 (S41 in FIG. 10). FIG. 7 illustrates an example of the profile content display screen which shows scanning conditions.

Then, the control apparatus 131 determines whether or not any of the scanning conditions or any one of the printing conditions has been changed (S42). If No in S42, the process goes to S66 (see FIG. 11). If Yes in S42, the process goes to S43.

If Yes in S42, the control apparatus 131 of the multifunction printer 103 causes the display apparatus 135 to display the profile saving option selection screen illustrated in FIG. 8 (S43).

Then, in a case where the user pushes the No button 210, the Overwrite Save button 211, or the Save As New Profile button 212, the control apparatus 131 determines which button has been pushed (S44). In a case where the control apparatus 131 determines that the No button 210 has been pushed, the process goes to S66 (see FIG. 11). In a case where the control apparatus 131 determines that the Overwrite Save button 211 is pushed, the process goes to S46. In a case where the control apparatus 131 determines that the Save As New Profile button 212 is pushed, the process goes to S45.

In a case where the control apparatus 131 of the multifunction printer 103 determines, in S44, that the Save As New Profile button 212 has been pushed, the control apparatus 131 causes the display apparatus 135 to display a screen for prompting a user to enter a name of a new profile. In a case where the user enters the name of the new profile by using the input apparatus 134, the control apparatus 131 correlates the name of the new profile with the profile thus changed (S45).

Then, the control apparatus 131 of the multifunction printer 103 transmits information indicative of the profile thus changed to the host PC 102 via the communication apparatus 133 and the network 104.

In a case where the control apparatus 121 of the host PC 102 has received the information of the profile via the network 104 and the communication apparatus 123 (S47), storage apparatus 122 (S48). Further, the control apparatus 121 transmits the information of the profile thus changed to the client PC 101 via the communication apparatus 123 and the network 104 (S49).

In a case where the control apparatus 111 of client PC 101 has received the information via the network 104 and the communication apparatus 113 (S50), the control apparatus 111 stores the information in the storage apparatus 112 (S61 in FIG. 11).

Then, the control apparatus 111 transmits, to the host PC 102 via the communication apparatus 113 and the network 104, a notification that the information of the profile has been stored in the storage apparatus 112.

In a case where the control apparatus 121 of the host PC 102 has received the notification via the network 104 and the communication apparatus 123 (S63), the control apparatus 121 further transmits the notification to the multifunction printer 103 via the communication apparatus 123 and the network 104 (S64).

As a result of the operation thus performed in S64, the control apparatus 131 of the multifunction printer 103 receives the notification from the host PC 102 via the network 104 and the communication apparatus 133 (S65).

Then, the control apparatus 131 of the multifunction printer 103 causes the image reading apparatus 37 to carry out scanning under conditions specified by the profile set in S41 (see FIG. 10) (S66). Further, the control apparatus 131 transmits an image obtained by scanning, i.e., a scanned image to the host PC 102 via the communication apparatus 133 and the network 104 (S67).

In a case where the control apparatus 121 of the host PC 102 has received the scanned image from the multifunction printer 103 via the network 104 and the communication apparatus 123 (S68), the control apparatus 121 further transmits the scanned image to the client PC 101 via the communication apparatus 123 and the network 104 (S69).

In a case where the control apparatus 111 of client PC 101 has received the scanned image from the host PC 102 via the network 104 and communication apparatus 113, the control apparatus 111 carries out a process (PC process) under the conditions specified by the profile set in S41 (see FIG. 10) (S70), and then stores, in the storage apparatus 112, the scanned image thus processed (S71).

As described above, the image processing system of the present embodiment is arranged such that the multifunction printer 103 creates, edits, and deletes a scanning profile and a printing profile in accordance with input operation of a user. A scanning profile and a printing profile which have been created or edited on the multifunction printer 103 are transmitted from the multifunction printer 103 to the host PC 102, and further transmitted to the client PC 101 so as to be stored in the host PC 102 and the client PC 101.

Profile information (see FIG. 2) and user information (see FIG. 3) are created on the client PC 101 or the host PC 102 by use of the scanning profile and the printing profile which have been received from the multifunction printer 103, and then stored in the client PC 101 and the host PC 102.

In a case where the client PC 101 is connected to the host PC 102, the profile information and the user information which are stored in the client PC 101 are transmitted to the host PC 102 so as to be stored in the host PC 102, as illustrated in FIG. 4. Accordingly, in a case where the client PC 101 is brought out from a first image processing system, and is connected to a second image processing system, the profile information and the user information which are stored in the client PC 101 are stored in the host PC 102 in the second image processing system.

This configuration brings about such an effect that, even in a case where the client PC 101 is brought out from the first image processing system and connected to the host PC 102 in the second image processing system, an existing scanning profile and an existing printing profile stored in the first image processing system can be used also in the second image processing system. This makes it possible to swiftly carry out scanning and printing in the second image processing system by using an existing scanning profile whose scanning conditions have been set, and an existing printing profile whose printing conditions have been set.

The client PC 101 in the image processing system of the present embodiment can have at least any one of (i) a function of creating and adding a scanning profile or a printing profile and (ii) a function of editing (modifying) and deleting a scanning profile or a printing profile which are stored in the storage apparatus 112 of the client PC 101. In this case, the client PC 101 can assign, respectively to an added profile and a modified profile, profile icons which are not assigned to any profile stored in the storage apparatus 122 of the host PC 102. The following describes how the image processing system operates for this.

Figure 12:
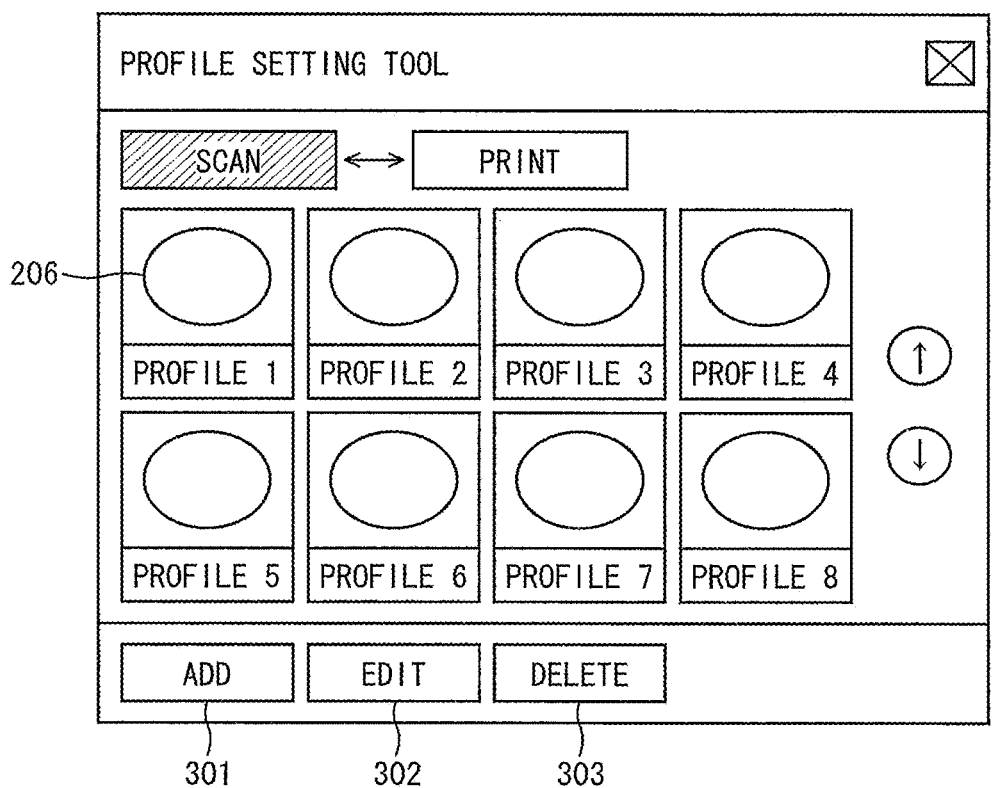
FIG. 12 is an explanatory view illustrating a first user interface (first screen of profile setting tool screens) for adding and modifying a profile which user interface is displayed on the screen of the client PC illustrated in FIG. 1.
Figure 13:
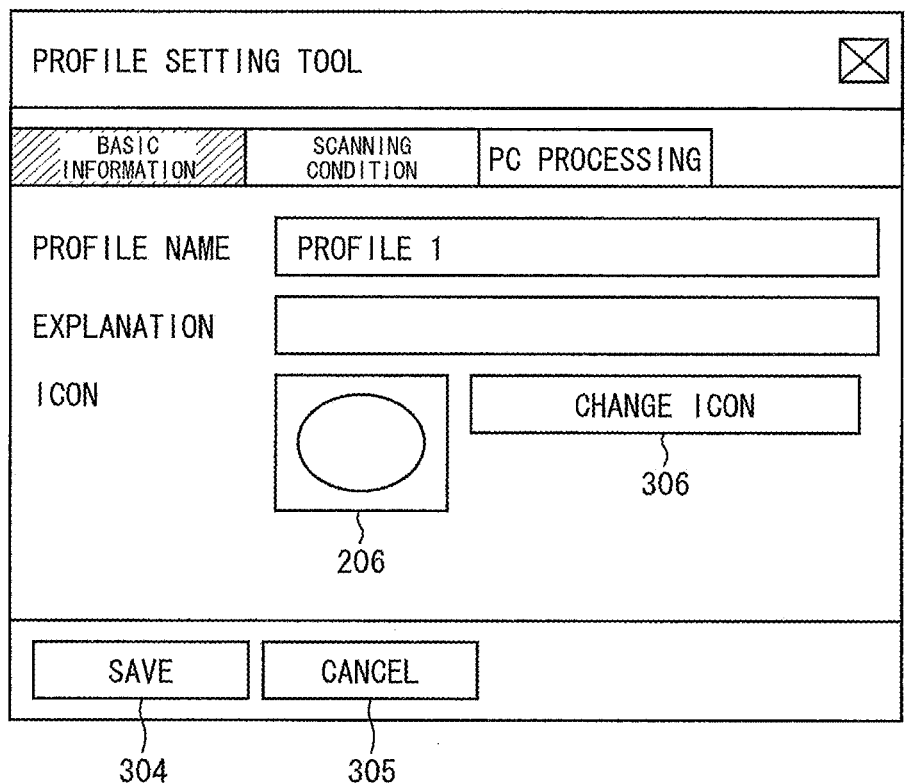
FIG. 13 is an explanatory view illustrating a second user interface (second screen of profile setting tool screens) for adding and modifying a profile which user interface is displayed on the screen of the client PC illustrated in FIG. 1.
Figure 14:
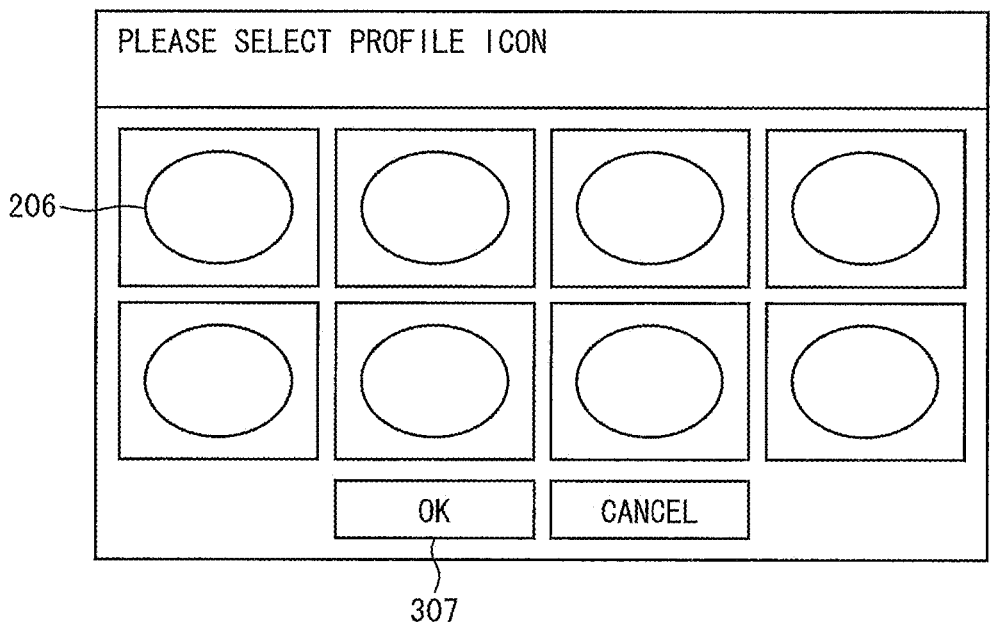
FIG. 14 is an explanatory view illustrating a third user interface (third screen of profile setting tool screens) for adding and modifying a profile which user interface is displayed on the screen of the client PC illustrated in FIG. 1.

FIG. 12 is an explanatory view illustrating a first user interface for adding and modifying a profile (first screen of profile setting tool screens, icon setting screen). FIG. 13 is an explanatory view illustrating a second user interface for adding and modifying a profile (second screen of profile setting tool screens, icon setting screen). FIG. 14 is an explanatory view illustrating a third user interface for adding and modifying a profile (third screen of profile setting tool screens, icon setting screen). These profile setting tool screens are switched in an order of the first screen, the second screen, and the third screen.

The client PC 101 allows input operation of a user on the profile setting tool screens so that the user can add or edit (modify) a scanning profile or a printing profile. For this operation, the control apparatus 111 of the client PC 101 requests, e.g., the host PC 102 to transmit display data indicative of the profile setting tool screens to the control apparatus 111 so as to obtain the display data.

Then, the control apparatus 111 causes the display apparatus 115 to display the first screen (as illustrated in FIG. 12) of the profile setting tool screens. The first screen shows a plurality of profiles stored in the storage apparatus 112 of the client PC 101, together with corresponding profile icons.

On the first screen, a user pushes an Add button 301 or pushes, after selecting a profile to be modified, an Edit button 302. Alternatively, a user pushes a Delete button 303 after selecting a profile to be deleted.

In a case where, e.g., a user has pushed the Edit button 302 after selecting a profile to be modified, the control apparatus 111 of client PC 101 causes the display apparatus 115 to display the second screen (as illustrated in FIG. 13) of the profile setting tool screens. The second screen allows the user to set basic information on the profile, scanning conditions, and PC processing conditions. In a case where a Save button 304 has been pushed, settings are saved. In a case where a Cancel button 305 has been pushed, the settings are discarded.

In a case where a Change Icon button 306 has been pushed, the control apparatus 111 of client PC 101 causes the display apparatus 115 to display the third screen (as illustrated in FIG. 14) of the profile setting tool screens. The third screen shows profile icons 206 which are not assigned to any profile stored in the storage apparatus 122 of the host PC 102. The profile icons 206 which are displayed on the third screen are ones which are stored in the client PC 101 or ones that the client PC 101 has obtained from the host PC 102 by request.

The third screen allows the user to select, as a profile icon 206 for a profile 1 (see FIG. 13), any one of the plurality of profile icons 206 thus displayed. In a case where the user has selected any one of the plurality of profile icons 206 and then pushed an OK button 307, the control apparatus 111 of client PC 101 temporarily sets a profile icon 206 thus selected, as the profile icon for the profile 1.

Then, the control apparatus 111 switches the third screen (see FIG. 14) to the second screen (see FIG. 13). In this case, the profile icon 206 displayed on the second screen is one which has been selected by the user on the third screen (see FIG. 14). In a case where the Save button 304 has been then pushed on the second screen (see FIG. 13), the control apparatus 111 stores the profile icon 206 thus changed, in the storage apparatus 112 as the profile icon 206 for the profile 1.

The information that is indicative of the profile icon 206 thus changed and is thus stored in the storage apparatus 112 is transmitted from the client PC 101 to the host PC 102 so as to be also stored in the storage apparatus 122 of the host PC 102.

Figure 15:
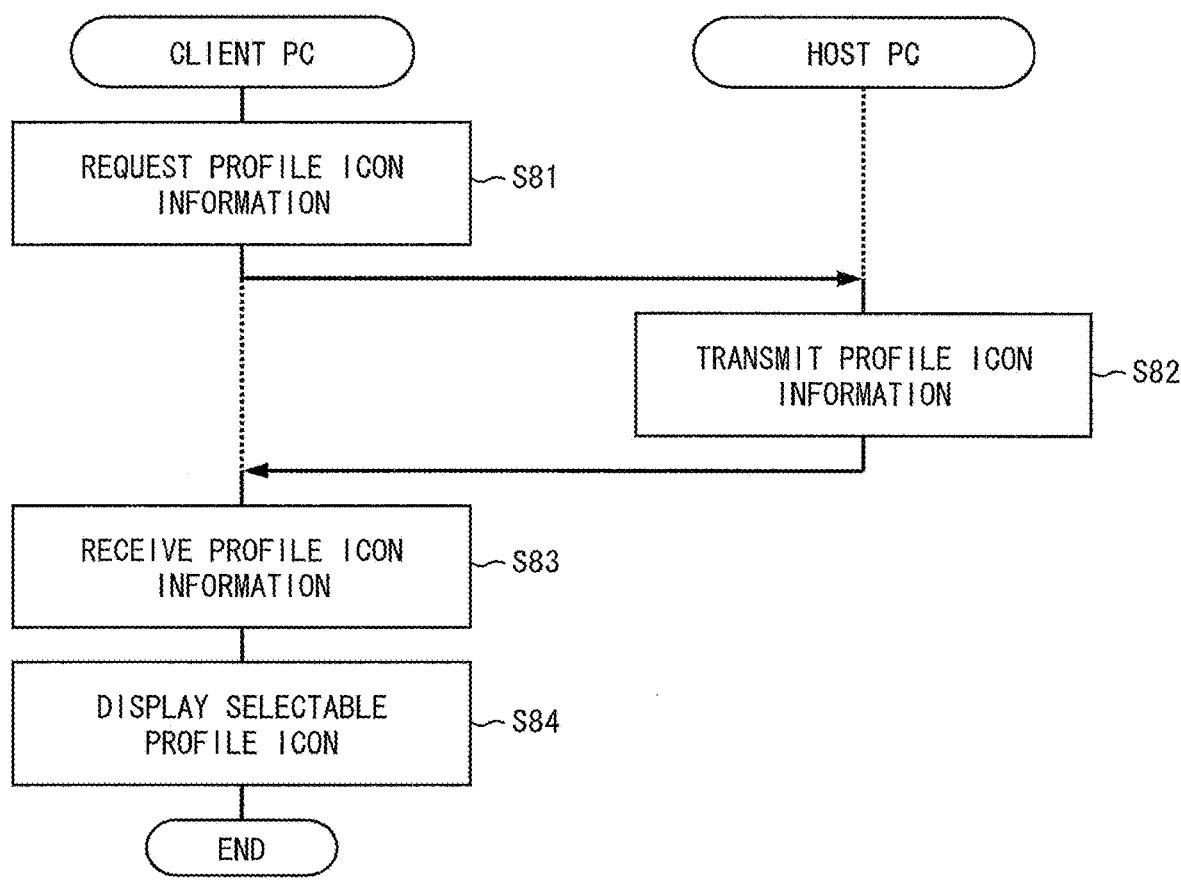
FIG. 15 is a flowchart showing how the client PC and the host PC 102 operate for displaying the third screen illustrated in FIG. 14.

The following describes how the client PC 101 and the host PC 102 operate for displaying the third screen (see FIG. 14). FIG. 15 is a flowchart showing how the client PC 101 and the host PC 102 operate for displaying the third screen illustrated in FIG. 14.

In a case where the Change Icon button 306 has been pushed on the second screen (see FIG. 13), the control apparatus 111 of client PC 101 transmits, to the host PC 102 via the communication apparatus 113 and the network 104, a request that the host PC 102 transmits profile icon information to the control apparatus 111, as illustrated in FIG. 15 (S81). The profile icon information is information indicative of a list of profile icons (profile icons 206 in FIG. 6) corresponding to profiles stored in the storage apparatus 122 of the host PC 102.

In a case where the control apparatus 121 of the host PC 102 has received the request from the client PC 101 via the network 104 and the communication apparatus 123, the control apparatus 121 transmits the profile icon information to the client PC 101 via the communication apparatus 123 and the network 104. Accordingly, the control apparatus 111 of client PC 101 receives the profile icon information from the host PC 102 via the communication apparatus 113 and the network 104 (S83).

Then, the control apparatus 111 of client PC 101 causes the display apparatus 115 to display, as selectable profile icons, all profile icons stored in the storage apparatus 112 except those contained in the profile icon information received from the host PC 102 (S84). This corresponds to the third screen illustrated in FIG. 14.

Thus, the image processing system of the present embodiment is arranged such that profile icons which have not been assigned to any profile stored in the storage apparatus 122 of the host PC 102 are assigned to a profile which has been newly created on the client PC 101 (i.e., added profile) and to a modified profile on the client PC 101, respectively. This makes it possible to assign different profile icons to all the profiles which are displayed on the display apparatus 135 of the multifunction printer 103, respectively, even for a profile which has been newly created on the client PC 101 or a profile which has been edited on the client PC 101. This makes it possible to prevent a user from wrongly selecting one of different profiles to which identical profile icons have been assigned.

Further, in the image processing system of the present embodiment, a scanning profile can contain a PC processing condition in addition to the scanning conditions, the PC processing condition regarding processing to which a scanned image obtained by the image reading apparatus 137 of the multifunction printer 103 is to be subjected. Similarly, in addition to printing conditions, a printing profile can contain a PC processing condition regarding processing to which printing data which is transmitted from the client PC 101 or the host PC 102 to the multifunction printer 103 is to be subjected.

In this case, the client PC 101 or the host PC 102 carries out the process to the scanned image in accordance with the PC processing condition. Similarly, the client PC 101 or the host PC 102 carries out the process to the printing data in accordance with the PC processing condition. Accordingly, at least one of the client PC 101 and the host PC 102 has a function of carrying out to the scanned image the process of specified by the PC processing condition. Similarly, at least one of the client PC 101 and the host PC 102 has a function of carrying out to the printing data the process specified by the PC processing condition. FIG. 11 shows an example of how the client PC 101 carries out the processing of a scanned image in accordance with a PC processing condition.

FIG. 16 is an explanatory view showing an overview of a data structure of PC processing conditions contained in profile information. As shown in FIG. 16, the PC processing conditions indicates, regarding each of the following PC processes, whether or not the process is to be carried out: image skew correction, character recognition (OCR), high image compression (process of reducing a size of an image file), a launch of an external application program, etc. Further, the PC processing condition indicates input parameters for the PC process to be carried out. Accordingly, at least one of the control apparatus 111 of the client PC 101 and the control apparatus 121 of the host PC 102 has a function of a processing section which carries out the PC process indicated by the PC processing conditions.

Figure 17:
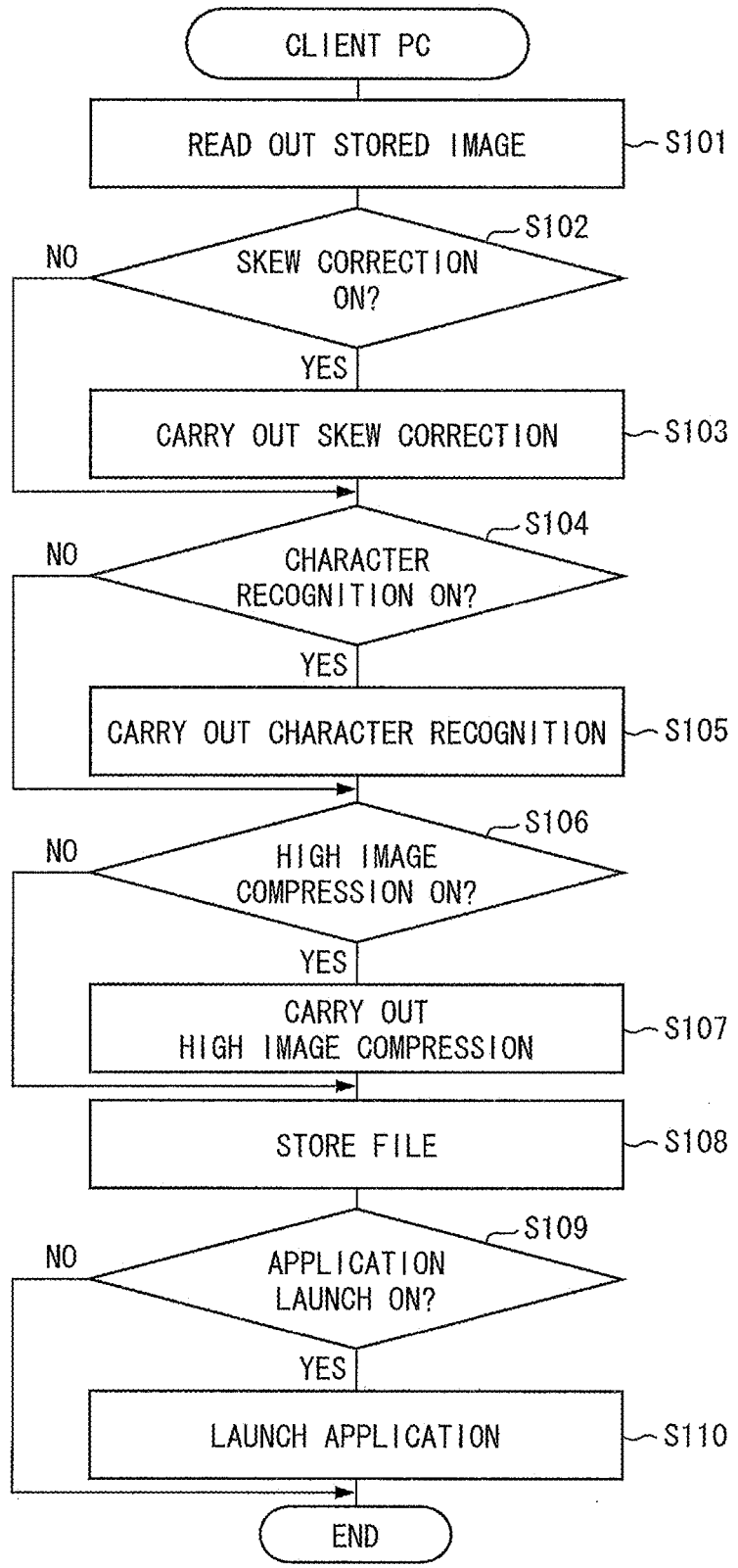
FIG. 17 is a flowchart showing how the client PC carries out the PC processes in a case where a profile which has been selected by a user on the profile list screen of FIG. 6 contains PC processing conditions.

FIG. 17 is a flowchart showing how the client PC 101 carries out the PC processes in a case where a profile which has been selected by a user on the profile list screen of FIG. 6 contains PC processing conditions. The PC processes are automatically carried out in the image processing system after operations from login to completion of scanning which operations are shown in FIGS. 9 through 11 are carried out. As shown in FIG. 17, the control apparatus 111 of the client PC 101 reads out a scanned image to be processed from the storage apparatus 122 in a case where the control apparatus 111 carries out the PC processes in accordance with PC processing conditions contained in a selected profile (S101).

In a case where the setting for the skew correction in the PC processing conditions is "ON" (S102), the control apparatus 111 carries out the skew correction in accordance with a skew correction parameter indicated by the PC processing conditions (S103).

In a case where the setting for the character recognition in the PC processing conditions is "ON" (S104), the control apparatus 111 then carries out the character recognition in accordance with a character recognition parameter indicated by the PC processing condition (S105).

In a case where the setting for the high image compression in the PC processing condition is "ON" (S106), the control apparatus 111 then carries out the high image compression in accordance with a high image compression parameter indicated by the PC processing condition (S107).

Then, the control apparatus 111 stores, in the storage apparatus 112, a file (scanned image data) which has been generated by being subjected to the PC processes (S108).

Then, in a case where the setting for a launch of an external application program is "ON" (S109), the control apparatus 111 launches the external application program in accordance with an application launch parameter (S110).

Thus, a profile in the image processing system of the present embodiment also contains PC processing conditions for the PC processes to be carried out on, e.g., the client PC 101. This allows the image processing system to carry out advanced processing as a whole.

The present embodiment has described an arrangement in which one client PC 101, one host PC 102, and one multifunction printer 103 are connected with each other via the network 104 in the image processing system. However, an arrangement of the image processing system is not limited to this but can be such that a plurality of client PCs 101, a plurality of host PCs 102, and a plurality of multifunction printers 103 are provided. For example, the image processing system may be arranged such that a plurality of client PC 101, one host PC 102, and a plurality of multifunction printers 103 are connected with each other via the network 104. In this case, the operations illustrated in FIGS. 9 through 11 are carried out parallel by each combination of a client PC 101 and a multifunction printer 103.

Further, the image processing system of the present embodiment is arranged such that the client PC 101, the host PC 102, and the multifunction printer 103 are separate apparatuses. However, the image processing system may be arranged such that the client PC 101 and the multifunction printer 103 are provided, and, for example, the multifunction printer 103 also has the function of the host PC 102.

Finally, blocks of each of the client PC 101, the host PC 102, and the multifunction printer 103 in the image processing system can be realized by way of hardware or software as executed by a CPU as below.

That is, each of the client PC 101, the host PC 102, and the multifunction printer 103 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting, to each of the client PC 101, the host PC 102, and the multifunction printer 103, a computer-readable storage medium containing control program code (executable program, intermediate code program, or source program) for each of the client PC 101, the host PC 102, and the multifunction printer 103, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

Each of the client PC 101, the host PC 102, and the multifunction printer 103 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention can also be realized by the program code in the form of a computer data signal embedded in a carrier wave which is embodied by electronic transmission.

As described above, the image processing system may be arranged such that: the processing execution condition information are a plurality of pieces of processing execution condition information, and identifiers for distinguishing the plurality of pieces of processing execution condition information are added to the plurality of pieces of processing execution condition information, respectively; in a case where the host-side control section has received a plurality of pieces of processing execution condition information from said client apparatus, the host-side control section checks whether or not an identifier of each of the plurality of pieces of processing execution condition information received from said client apparatus matches any one of identifiers of a plurality of pieces of processing condition information previously stored in the host-side storage apparatus; in a case where an identifier of one of the plurality of pieces of processing execution condition information received from said client apparatus matches an identifier of one of the plurality of pieces of processing condition information previously stored in the host-side storage apparatus, the host-side control section overwrites the one of the plurality of pieces of processing condition information previously stored in the host-side storage apparatus with the one of the plurality of pieces of processing execution condition information received from said client; and in a case where the identifier of the one of the plurality of pieces of processing execution condition information received from said client apparatus does not match any one of identifiers of the plurality pieces of processing condition information previously stored in the host-side storage apparatus, the host-side control section stores, in the host-side storage apparatus, the one of the plurality of pieces of processing execution condition information received from said client, as a new piece of processing execution condition information.

According to the arrangement, it is possible to appropriately store, in the host-side storage apparatus, the processing execution condition information received from the client apparatus even if the host-side storage apparatus of the host apparatus retains existing processing execution condition information.

The image processing system may be arranged such that: said image forming apparatus further includes an image forming apparatus-side display apparatus, an image forming apparatus-side input apparatus, and an image forming apparatus-side control section; the image forming apparatus-side control section causes the image forming apparatus-side display apparatus to display a processing execution condition setting screen for use in setting a processing execution condition indicated by processing execution condition information; the image forming apparatus-side control section receives a processing execution condition being set on the processing execution condition setting screen in accordance with an input supplied via the image forming apparatus-side input apparatus, and transmits the processing execution condition to said host apparatus as processing execution condition information; the host-side control section of said host apparatus stores, in the host-side storage apparatus, the processing execution condition information received from said image forming apparatus, and transmits the processing execution condition information to said client apparatus; and the client-side control section of said client apparatus stores, in the client-side storage apparatus, the processing execution condition information received from said host apparatus.

According to the arrangement, the processing execution condition information is created by the image forming apparatus, and stored in the host-side storage apparatus of the host apparatus and in the client-side storage apparatus of the client apparatus.

This allows the host apparatus and the client apparatus to commonly retain the processing execution condition information created by the image forming apparatus. This makes it possible to prevent the client apparatus brought out from the first image processing system from not having the processing execution condition information used in the first image processing system. This makes it possible to effectively utilize the existing processing execution condition information used in the first image processing system, also in the second image processing system in which the client apparatus is brought.

The image processing system may be arranged such that: the processing execution condition information are a plurality of pieces of processing execution condition information; the plurality of pieces of processing execution condition information are correlated with a plurality of pieces of icon information, respectively, the plurality of pieces of icon information being indicative of respective icons of the plurality of pieces of processing execution condition information, the plurality of pieces of icon information are stored in the host-side storage apparatus; said image forming apparatus includes an image forming apparatus-side display apparatus, an image forming apparatus-side input apparatus, and image forming apparatus-side control section; in accordance with an instruction inputted via the image forming apparatus-side input apparatus, the image forming apparatus-side control section obtains, from said host apparatus, the plurality of pieces of processing execution condition information and the plurality of pieces of icon information by transmitting a request to said host apparatus, the image forming apparatus-side control section causes the image forming apparatus-side display apparatus to display a list of the plurality of pieces of processing execution condition information and the icons indicated by the plurality of pieces of icon information, so that any one of the plurality of pieces of processing execution condition information is selectable, the image forming apparatus-side display apparatus displaying the list of the plurality of pieces of processing execution condition information and the icons in such a manner that the icons are correlated with the plurality of pieces of processing execution condition information, and in accordance with the request from said image forming apparatus, the host-side control section transmits, to said image forming apparatus, the plurality of pieces of processing execution condition information and the plurality of pieces of icon information.

According to the arrangement, the image forming apparatus-side display apparatus displays the list of the plurality of pieces of processing execution condition information and the icons indicated by the plurality of pieces of icon information so that the icons are correlated with the plurality of pieces of processing execution condition information in order that any one thereof is selected. This allows a user to intuitively determine, by referring to the icons, a desired one of the plurality of pieces of processing execution condition information in a case where the user selects any one of the plurality of pieces of processing execution condition information on the image forming apparatus-side section. This makes it possible to easily select a desired one of the plurality of pieces of processing execution condition information.

The image processing system may be arranged such that: the processing execution condition information are a plurality of pieces of processing execution condition information; the plurality of pieces of processing execution condition information are correlated with a plurality of pieces of icon information, respectively, the plurality of pieces of icon information being indicative of respective icons of the plurality of pieces of processing execution condition information, the plurality of pieces of icon information are stored in the host-side storage apparatus; said client apparatus further includes a client-side display apparatus and a client-side input apparatus; the client-side storage apparatus stores a plurality of pieces of icon information indicative of icons; in a case where the client-side control section is instructed by an input supplied via the client-side input apparatus to add the icons to the plurality of pieces of processing execution condition information, the client-side control section (i) obtains from said host apparatus, by transmitting a request to said host apparatus, the plurality of pieces of icon information indicative of the icons correlated with the plurality of pieces of processing execution condition information which plurality of pieces of icon information are stored in the host-side storage apparatus; the client-side control section causes the client-side display apparatus to display an icon setting screen showing an icon or icons indicated by the icon information stored in the client-side apparatus but being different from the plurality of pieces of icon information obtained from said host apparatus; and the client-side control section determines an icon selected on the icon setting screen by an input supplied via the client-side input apparatus, as an icon to be assigned to processing execution condition information which needs an icon.

According to the arrangement, assigned to processing execution condition information which needs an icon is a piece of icon information which is not assigned to any one of the plurality of pieces of processing execution condition information stored in the host-side storage apparatus of the host apparatus. This makes it possible to assign different pieces of icon information to, e.g., all the plurality of pieces of processing execution condition information displayed on the image forming apparatus-side display apparatus even if the plurality of pieces of processing execution condition information are, e.g., those newly created on the client apparatus. This makes it possible to prevent a user from wrongly selecting one processing execution condition information different from desired processing execution condition information because an identical icon is assigned to both the one processing execution condition information and the desired processing execution condition information.

The image processing system may be arranged such that: the client-side storage apparatus stores user information on a plurality of users; the user information contains identifiers of the plurality of pieces of processing execution condition information, the identifiers being correlated respectively with each of the plurality of users; in a case where said client apparatus is connected with said host apparatus via the network, the client-side control section transmits to said host apparatus the user information stored in the client-side storage apparatus; said image forming apparatus includes an image forming apparatus-side display apparatus, an image forming apparatus-side input apparatus, and an image forming apparatus-side control sections; in a case where the image forming apparatus-side display apparatus is instructed by a user-specified input supplied via image forming apparatus-side input apparatus to display a processing execution condition information list screen for a specific user, the image forming apparatus-side control section obtains from said host apparatus, by transmitting a request to said host apparatus, display data indicative of the processing execution condition information list screen; in accordance with the obtained display data, the image forming apparatus-side control section causes the image forming apparatus-side display apparatus to display the processing execution condition information list screen; the host-side control section stores, in the host-side storage apparatus, the user information received from said client apparatus; and in accordance with the request from the image forming apparatus, the host-side control section refers to the user information so as to create display data indicative of the processing execution condition information list screen which shows a list of pieces of processing execution condition information correlated the specific user, and the host-side control section transmits the display data to said image forming apparatus.

According to the arrangement, the image forming apparatus-side display apparatus is instructed by the user-specified input to display the processing execution condition information list screen, the image forming apparatus-side display apparatus displays the processing execution condition information list screen which shows a list of a plurality of pieces of processing execution condition information correlated with the specific user. This makes it possible to prevent a user from wrongly selecting one of the plurality of pieces of processing execution condition information when selecting one of the plurality of pieces of processing execution condition information for the image reading or printing.

The image processing system may be arranged such that: the processing execution condition information further contains additional processing execution condition information indicative of an execution condition of an additional process which is carried out on said client apparatus or on said host apparatus; the additional processing execution condition information indicates a condition for processing of at least one of (i) an image read by said image reading apparatus and (ii) printing data to be used in printing by said printing apparatus; and at least one of the client-side control section and the host-side control section carries out the additional process in accordance with the additional processing execution condition information.

According to the arrangement, the processing execution condition information contains additional processing execution condition information indicative of an execution condition of an additional process which is carried out on the client apparatus or on the host apparatus with respect to at least one of a read image and printing data. This allows the image processing system to carry out advanced processing as a whole by using the processing execution condition information.

The image processing system may be arranged such that: the image forming apparatus-side control section causes image forming apparatus-side display apparatus to display a processing execution condition information content screen which shows content of a selected one of the plurality of pieces of processing execution condition information.

According to the arrangement, the processing execution condition information content screen allows a user to easily check the content of a selected one of the plurality of pieces of processing execution condition information, which is used in the image reading by the image reading apparatus or the printing by the printing apparatus.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

REFERENCE SIGNS LIST

101 Client PC (client apparatus)
102 Host PC (host apparatus)
103 Multifunction printer (image forming apparatus)
104 Network
111 Control apparatus (client-side control apparatus)
112 Storage apparatus (client-side storage apparatus)
114 Input apparatus (client-side input apparatus)
115 Display apparatus (client-side display apparatus)
121 Control apparatus (host-side control apparatus)
122 Storage apparatus (host-side storage apparatus)
131 Control apparatus (image forming apparatus-side control apparatus)
132 Storage apparatus (image forming apparatus-side storage apparatus)
134 Input apparatus (image forming apparatus-side input apparatus)
135 Display apparatus (image forming apparatus-side display apparatus)
136 Printing apparatus

The invention claimed is:

1. A host apparatus connectable with an image reading apparatus via a network, the host apparatus comprising:
a host-side storage apparatus; and
a host-side controller configured or programmed to:
cause the host-side storage apparatus to store processing execution condition information indicative of an execution condition of scanning which is carried out on the image reading apparatus;
receive, from the image reading apparatus, a request that the host apparatus transmit the processing execution condition information;
transmit, to the image reading apparatus in response to the request, the processing execution condition information stored in the host-side storage apparatus;
receive changed processing execution condition information from the image reading apparatus, the changed processing execution condition information resulting from the image reading apparatus changing the processing execution condition information transmitted to the image reading apparatus;
cause the host-side storage apparatus to store the changed processing execution condition information in place of the processing execution condition information stored in the host-side storage apparatus; and
(i) allow a user to log in from the image reading apparatus and (ii) provide the image reading apparatus with a scanning profile corresponding to the user who has logged in.

2. The host apparatus as set forth in claim 1, wherein:
the processing execution condition information includes a plurality of pieces of processing execution condition information;
identifiers that distinguish the plurality of pieces of processing execution condition information are included with the plurality of pieces of processing execution condition information, respectively;
the host-side controller checks whether or not the identifier of each of the plurality of pieces of processing execution condition information received matches any one of the identifiers of the plurality of pieces of processing condition information previously stored in the host-side storage apparatus;

in a case where the identifier of one of the plurality of pieces of processing execution condition information received matches the identifier of one of the plurality of pieces of processing condition information previously stored in the host-side storage apparatus, the host-side controller overwrites the one of the plurality of pieces of processing condition information previously stored in the host-side storage apparatus with the one of the plurality of pieces of processing execution condition information received; and in a case where the identifier of the one of the plurality of pieces of processing execution condition information received does not match any one of the identifiers of the plurality pieces of processing condition information previously stored in the host-side storage apparatus, the host-side controller stores, in the host-side storage apparatus, the one of the plurality of pieces of processing execution condition information received, as a new piece of processing execution condition information.

3. The host apparatus as set forth in claim 1, wherein the host apparatus displays a login screen that displays one or more login buttons, and receives selection of one of the one or more login buttons by a user so as to log into the image reading apparatus.

4. The host apparatus as set forth in claim 3, wherein the one or more login buttons each include a user name and a user icon of a user registered in the host apparatus.

5. An information processing method to be carried out by a host apparatus connectable with an image reading apparatus via a network, the host apparatus including:
- a host-side storage apparatus; and
- a host-side controller, the method comprising the steps of:
- causing the host-side controller to cause the host-side storage apparatus to store processing execution condition information indicative of an execution condition of scanning which is carried out on the image reading apparatus;
- causing the host-side controller to (i) receive, from the image reading apparatus, a request that the host apparatus transmit the processing execution condition information and (ii) transmit, to the image reading apparatus and in response to the request, the processing execution condition information stored in the host-side storage apparatus;
- causing the host-side controller to (i) receive changed processing execution condition information transmitted from the image reading apparatus in response to the processing execution condition information stored in the host-side storage apparatus being transmitted to the image reading apparatus, the changed processing execution condition information being transmitted with respect to the processing execution condition information to the host-side storage apparatus, and (ii) cause the host-side storage apparatus to store the changed processing execution condition information in place of the processing execution condition information stored in the host-side storage apparatus.

* * * * *